(12) United States Patent
Sakurai et al.

(10) Patent No.: US 11,518,570 B2
(45) Date of Patent: Dec. 6, 2022

(54) CONTAINER SPOUT PORTION, RESIN MADE CONTAINER HAVING THE CONTAINER SPOUT PORTION AND PREFORM HAVING THE CONTAINER SPOUT PORTION

(71) Applicant: SUNTORY HOLDINGS LIMITED, Osaka (JP)

(72) Inventors: Takuya Sakurai, Tokyo (JP); Takuto Kato, Tokyo (JP); Toshiya Kobayashi, Tokyo (JP)

(73) Assignee: SUNTORV HOLDINGS LIMITED, Osaka (JP)

( * ) Notice: Subject to any disclaimer, the term of this patent is extended or adjusted under 35 U.S.C. 154(b) by 100 days.

(21) Appl. No.: 16/618,418

(22) PCT Filed: Jun. 6, 2018

(86) PCT No.: PCT/JP2018/021755
§ 371 (c)(1),
(2) Date: Dec. 2, 2019

(87) PCT Pub. No.: WO2018/235604
PCT Pub. Date: Dec. 27, 2018

(65) Prior Publication Data
US 2020/0317387 A1 Oct. 8, 2020

(30) Foreign Application Priority Data
Jun. 23, 2017 (JP) .............................. JP2017-123442

(51) Int. Cl.
*B29B 11/14* (2006.01)
*B65D 1/02* (2006.01)
(Continued)

(52) U.S. Cl.
CPC ....... *B65D 1/0246* (2013.01); *B65D 41/0407* (2013.01); *B29C 49/06* (2013.01); *B29L 2031/7158* (2013.01)

(58) Field of Classification Search
CPC . B29B 2911/14413; B29B 2911/14846; B29B 2911/14786; B29B 2911/1472;
(Continued)

(56) References Cited

U.S. PATENT DOCUMENTS 4,298,036 A * 11/1981 Horvath ................. A45D 40/04
141/1

FOREIGN PATENT DOCUMENTS

DE   203 19 786   6/2005
JP   07-257612    10/1995
(Continued)

OTHER PUBLICATIONS

Official Communication issued in International Patent Application No. PCT/JP2018/021755, dated Jul. 10, 2018, along with an English translation thereof.
(Continued)

*Primary Examiner* — Allan D Stevens
(74) *Attorney, Agent, or Firm* — Greenblum & Bernstein, P.L.C.

(57) ABSTRACT

In a container spout portion included in a container body and configured to be sealed as a seal portion comes into contact with an inner circumferential face in association of attachment thereto of a cap having the seal portion therein, an arcuate portion convex inwards is formed between a top face and the inner circumferential face of the container spout portion. A tangential line to the arcuate portion starts from either a joining point between the arcuate portion and the top face or from a crossing point between a virtual extension line of the arcuate portion and the top face or a virtual extension
(Continued)

line of the top face. An angle θ formed between the top face and the tangential line ranges from 30 to 60 degrees.

6 Claims, 4 Drawing Sheets

(51) Int. Cl.
*B65D 41/04* (2006.01)
*B29C 49/06* (2006.01)
*B29L 31/00* (2006.01)

(58) Field of Classification Search
CPC .......... B29B 2911/14328; B65D 41/17; B29C 2949/0769
See application file for complete search history.

(56) References Cited

FOREIGN PATENT DOCUMENTS

| | | |
|---|---|---|
| JP | 2005-088447 | 4/2005 |
| JP | 2015-131666 | 7/2015 |
| JP | 2016-159977 | 9/2016 |
| WO | 2015/181978 | 12/2015 |

OTHER PUBLICATIONS

Official Communication issued in International Patent Application No. PCT/JP2018/021755, dated Dec. 24, 2019, along with an English translation thereof.
Extended European Search Report for DE Application No. 18821620.4 dated Mar. 18, 2021.

* cited by examiner

CONTAINER SPOUT PORTION, RESIN MADE CONTAINER HAVING THE CONTAINER SPOUT PORTION AND PREFORM HAVING THE CONTAINER SPOUT PORTION

TECHNICAL FIELD

The present invention relates to a container spout (mouth) portion included in a container body and configured to be sealed as a seal portion comes into contact with an inner circumferential face in association of attachment thereto of a cap having the seal portion therein.

BACKGROUND ART

As examples of a container having such container spout portion, there can be cited resin made containers such as a preform, a bottle container manufactured with using the preform, etc.

When a plurality of such resin made containers are accommodated in a container or the like for their transportation therein, due to hitting between the resin made containers, a dent damage may be generated/formed at the spout portion of the resin made container. If a cap is fitted on the spout portion with such dent damage in the resin made container, the seal portion of the cap may be damaged by the dent damage of the spout portion, so that there is a risk of leaking of contents filled in the resin made container through the damaged portion of the seal portion.

In view of the above-described situation, a resin made container has been manufactured and sold in Europe since the year 2011 which is designed to attempt prevention of reduction in the sealing performance of the container spout portion through reduction of occurrence of dent damage at the spout portion of a preform therefor. To this end, in this preform, as disclosed in e.g. Patent Document 1, at the container spout portion, a chamfered portion is formed between a top face and an inner circumferential face of the preform.

BACKGROUND ART DOCUMENT

Patent Document

Patent Document 1: Japanese Unexamined Patent Application No. 2015-131666 Publication Document

SUMMARY OF THE INVENTION

Problem to be Solved by Invention

However, with the configuration of the conventional container spout portion, a dent may be formed at a lower portion of the chamfered portion. If this happens, reduction in the sealing performance of the container spout portion will occur. Thus, there remains room for improvement. Therefore, the object of the present invention is to provide a spout portion configuration that can effectively resist formation/generation of a dent damage therein at the time of e.g. transport, thus being capable of preventing reduction in the sealing performance of the container spout portion.

Solution

According to a characterizing feature of a container spout portion relating to the present invention, there is provided a container spout portion included in a container body and configured to be sealed as a seal portion comes into contact with an inner circumferential face in association of attachment thereto of a cap having the seal portion therein;

wherein an arcuate portion convex inwards is formed between a top face and the inner circumferential face of the container spout portion;

a tangential line to the arcuate portion starts from either a joining point between the arcuate portion and the top face or from a crossing point between a virtual extension line of the arcuate portion and the top face or a virtual extension line of the top face; and an angle formed between the top face and the tangential line ranges from 30 to 60 degrees.

According to a further characterizing feature of the container spout portion relating to the present invention, the arcuate portion has a curvature radius equal to or less than 6 mm.

According to a still further characterizing feature of the container spout portion relating to the present invention, a distance from the joining point between the arcuate portion and the top face or the crossing point between the virtual extension line of the arcuate portion and either the top face or the virtual extension line of the top face to a virtual extension line of the inner circumferential face ranges from 0.3 mm to 3.0 mm.

According to a still further characterizing feature of the container spout portion relating to the present invention, a distance from a joining portion between the arcuate portion and the inner circumferential face or a crossing point between the virtual extension line of the arcuate portion and either the inner circumferential face or the virtual extension line of the inner circumferential face to the virtual extension line of the top face ranges from 0.3 mm to 3.0 mm.

According to a still further characterizing feature of the container spout portion relating to the present invention, between the arcuate portion and the top face and between the arcuate portion and the inner circumferential face, there are formed further arcuate portions each having a smaller curvature radius than the arcuate portion.

Effects of Invention

With the present invention: an arcuate portion convex inwards is formed between a top face and the inner circumferential face of the container spout portion; a tangential line to the arcuate portion starts from either a joining point between the arcuate portion and the top face or from a crossing point between a virtual extension line of the arcuate portion and the top face or a virtual extension line of the top face; and an angle formed between the top face and the tangential line ranges from 30 to 60 degrees. With these arrangements, the joining point between the arcuate portion and the inner circumferential face can be provided at a lower position. As a result, possibility of formation or generation of a dent damage affecting the sealing performance of the container spout portion at this joining portion between the arcuate portion and the inner circumferential face can be reduced. Moreover, in particular, in case further arcuate portions each having a smaller curvature radius than the arcuate portion are formed between the arcuate portion and the top face as well as between the arcuate portion and the inner circumferential face, the joining point between the arcuate portion and the inner circumferential face can be provided at an even lower position. As a result, possibility of formation or generation of a dent damage at the joining portion between the arcuate portion and the inner circumferential face can be further reduced. Consequently, the reduction in the sealing performance of the container spout portion can be prevented.

MODE OF EMBODYING THE INVENTION

Embodiment

Next, an embodiment of a container spout portion relating to the present invention will be explained with reference to the accompanying drawings. Here, there will be explained an exemplary case wherein the inventive container spout portion is applied to a resin made bottle container.

Figure 1:
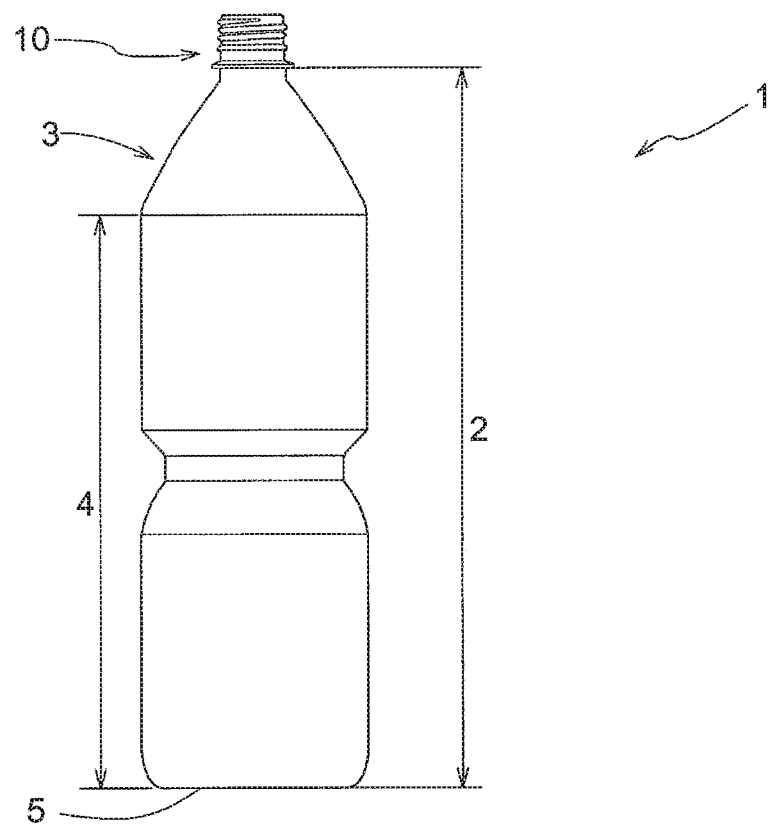
FIG. 1 is a side view of a bottle container.
Figure 2:
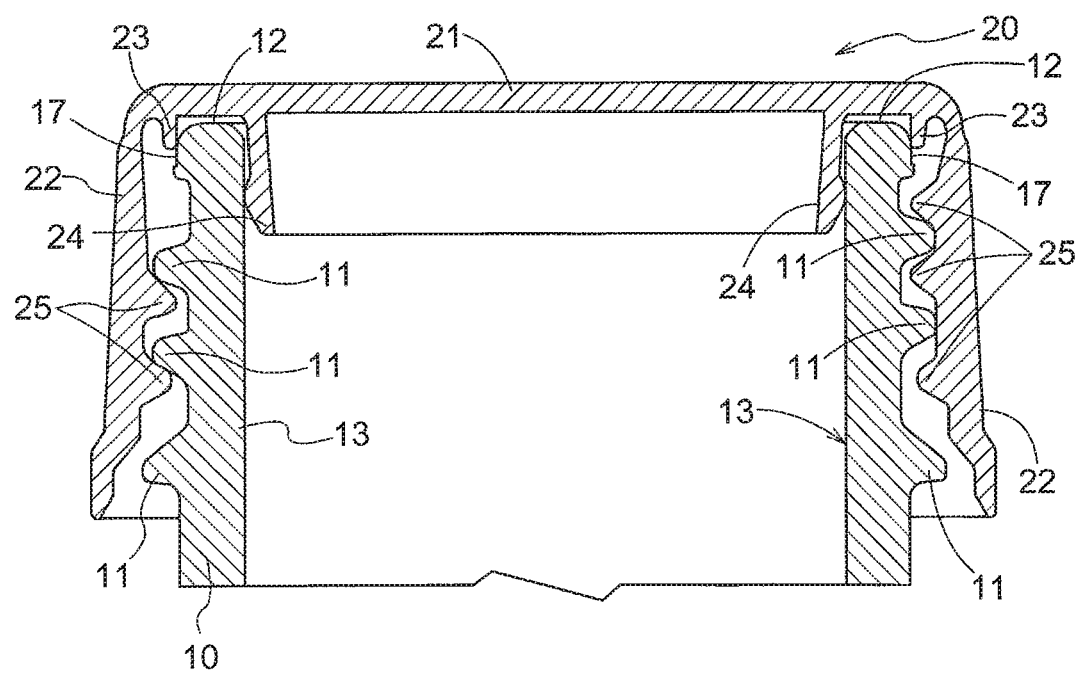
FIG. 2 is a vertical section view showing a condition when a cap is fitted to a container spout portion of the bottle container.

As shown in FIG. 1 and FIG. 2, a bottle container 1 relating to this embodiment includes a container body 2 having a bottomed cylindrical shape and a cylindrical container spout portion 10 provided at the leading end of the container body 2 integrally therewith. The container spout portion 10 is arranged to be fitted with a cap 20 thereon.

Figure 3:
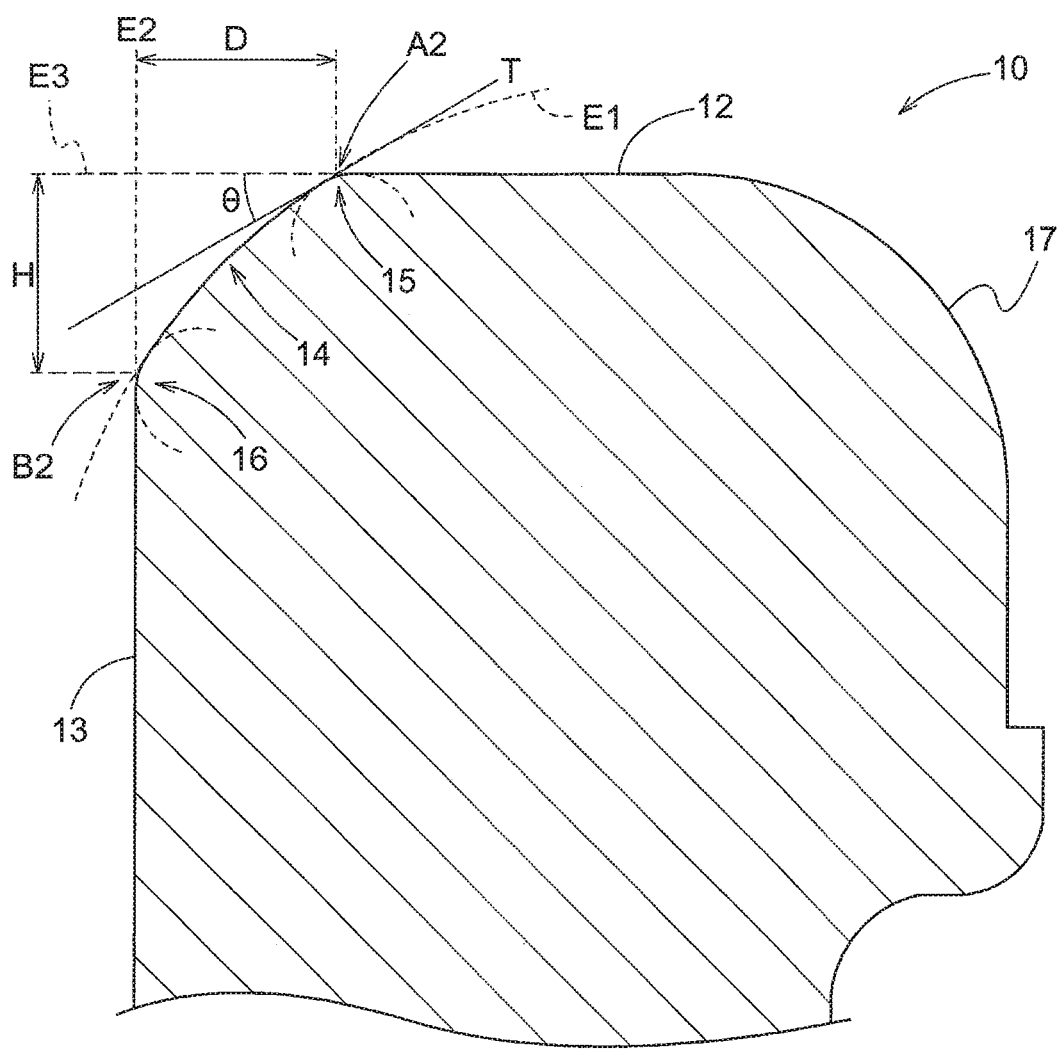
FIG. 3 is an enlarged view of principal portions of the container spout portion.

As shown in FIG. 2 and FIG. 3, the cap 20 used in this embodiment includes a top plate portion 21, a tubular portion 22 extending downwards from the circumferential edge of the top plate portion 21 and having threads 25 in its inner circumferential face, an outer ring 23 formed on the inner face of the top plate portion 21 and coming into contact with an outer circumferential face 17 of the container spout portion 10, and an inner ring 24 (an example of "seal portion") formed on the inner face of the top plate portion 21 and coming into contact with an inner circumferential face 13 of the container spout portion 10. The cap 20 applicable in this invention is not limited to the one having the above-described configuration. Instead, a known standard cap having a seal portion capable of sealing by coming into contact with the inner circumferential face of the container spout portion may be used also.

The outer ring 23 and the inner ring 24 each has a shape protruding from the inner face of the top plate portion 21. In the instant embodiment, the length of the inner ring 24 (the vertical distance from the top plate portion 21) is longer than that of the outer ring 23. As the outer ring 23 and the outer circumferential face 17 of the container spout portion 10 come into contact with each other and also the inner ring 24 and the inner circumferential face 13 of the container spout portion 10 come into contact with each other, the bottle container 1 is sealed.

The material and the manufacturing method of the cap 20 are not particularly limited. For instance, the cap 20 may be manufactured by integrally molding by a known molding technique the top plate portion 21, the tubular portion 22, the outer ring 23 and the inner ring 24 with using resin such as polyethylene, polypropylene, polystyrene, etc.

As shown in FIG. 1 and FIG. 2, the container body 2 includes a shoulder portion 3 formed continuous with the container spout portion 10, a body portion 4 continuous with the shoulder portion 3, and a bottom portion 5 continuous with the body portion 4 and located at the lowest part.

The bottle container 1 in this embodiment is a container made of resin such as polyethyleneterephthalate (PET), polyethylene, polypropylene, etc. In this bottle container 1, with use of a preform having the container spout portion 10 molded by e.g. the injection molding technique, the container body 2 is molded by the blow molding technique, thus forming the container body 2 and the container spout portion 10 integral with each other. Such bottle container 1 can be used as a beverage container for water, carbonated beverage or the like, a food container for e.g. sauce or the like, etc.

As shown in FIG. 2 and FIG. 3, the container spout portion 10 includes a top face 12, the inner circumferential face 13 and the outer circumferential face 17. In the outer circumferential face 17 of the container spout portion 10, threads 11 are provided. These threads 11 of the container spout portion 10 can be meshed with the threads 25 of the cap 20 and the cap 20 can be attached/detached to/from the container spout portion 10. Further, an arrangement is provided such that with fitting of the cap 20 on the container spout portion 10, the outer ring 23 comes into contact with the outer circumferential face 17 of the container spout portion 10 and also the inner ring 24 comes into contact with the inner circumferential face 13 of the container spout portion 10.

As shown in FIG. 3, an arcuate portion 14 formed convex toward the inner side of the container is formed between the top face 12 and the inner circumferential face 13 of the container spout portion 10. Further, a second arcuate portion 15 formed convex toward the inner side of the container is formed between the arcuate portion 14 and the top face 12, and a third arcuate portion 16 formed convex toward the inner side of the container is formed between the arcuate portion 14 and the inner circumferential face 13. Namely in the container spout portion 10 relating to the instant embodiment, three arcuate portions, i.e. the second arcuate portion 15, the arcuate portion 14 and the third arcuate its portion 16 are formed continuously from the top face 12 to the inner circumferential face 13. Incidentally, the second arcuate portion 15 and the third arcuate portion 16 correspond to "further arcuate portions" in this invention, and the curvature radius of the second arcuate portion 15 and the third arcuate portion 16 respectively is smaller than that of the arcuate portion 14.

A tangential line T to the arcuate portion 14 starts from a crossing point A2 between a virtual extension line E1 of the arcuate portion 14 and the top face 12 or a virtual extension line E3 of this top face 12. And, an angle θ formed between the top face 12 and the tangential line T ranges preferably from 30 to 60 degrees, more preferably from 30 to 50 degrees. Incidentally, the tangential line T in this embodiment starts at a crossing point A2 between the virtual extension line E1 of the arcuate portion 14 and the virtual extension line E3 of the top face 12 and its angle θ is set to 40 degrees.

The curvature radius of the arcuate portion 14 is equal to or less than 6 mm, preferably from 1.0 mm to 6.0 mm, more preferably from 1.0 mm to 4.0 mm. The curvature radius of the arcuate portion 14 in this embodiment is set to 3.0 mm.

The curvature radius of the second arcuate portion 15 and the third arcuate portion 16 respectively ranges preferably from 0.1 mm to 1.0 mm. Incidentally; in this embodiment, the respective curvature radii of the second arcuate portion 15 and the third arcuate portion 16 are set identically to 0.3 mm.

A distance from the crossing point A2 between the virtual extension line E1 of the arcuate portion 14 and the top face 12 or the virtual extension line E3 of this top face 12 (in this embodiment, this is set as the crossing point between the virtual extension line E1 of the arcuate portion 14 and the virtual extension line E3 of the top face 12) to the virtual extension line E2 of the inner circumferential face 13 ranges preferably from 0.3 mm to 3.0 mm, more preferably from 0.3 mm to 1.0 mm, most preferably from 0.3 mm to 0.6 mm. The distance D in this embodiment is set to 0.33 mm.

A distance H from a crossing point B2 between the virtual extension line E1 of the arcuate portion 14 and the inner circumferential face 13 or the virtual extension line E2 of this inner circumferential face 13 (in this embodiment, this is set as the crossing point between the virtual extension line E1 of the arcuate portion 14 and the virtual extension line E2 of this inner circumferential face 13) to the virtual extension line E3 of the top face 12 ranges preferably from 0.3 mm to 3.0 mm, more preferably from 0.3 mm to 1.0 mm, most preferably from 0.3 mm to 0.6 mm. The distance II in this embodiment is set to 0.32 mm.

Other Embodiments

In the foregoing embodiment, the second arcuate portion 15 and the third arcuate portion 16 are provided. However, the invention is not limited thereto. Alternatively, the second arcuate portion 15 and the third arcuate portion 16 may be omitted. In such case, the tangential line T to the arcuate portion 14 will start from the joining point A1 between the arcuate portion 14 and the top face 12. And, the angle θ between the top face 12 and the tangential line T will range preferably from 30 to 60 degrees, more preferably from 30 to 50 degrees (see FIG. 4 and FIG. 5). Further, the distance D from the joining point A1 between the arcuate portion 14 and the top face 12 to the virtual extension line E2 of the inner circumferential face 13 will range preferably from 0.3 mm to 3.0 mm. And, the distance H from a joining point B1 between the arcuate portion 14 and the inner circumferential face 13 to the virtual extension line E3 of the top face 12 will range preferably from 0.3 mm to 3.0 mm (see FIG. 4 and FIG. 5).

Figure 6:
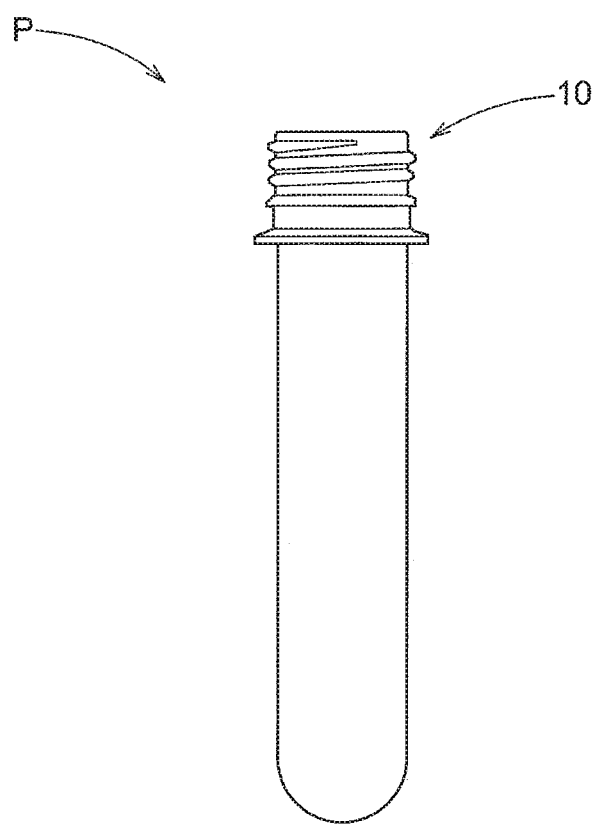
FIG. 6 is a side view of a preform.

In the foregoing embodiment, there was disclosed a case in which the inventive container spout portion is applied to a resin made bottle container. However, the invention is not limited thereto. Alternatively, for instance, the invention may be applied to a bottomed cylindrical preform P or the like having one side thereof opened, as shown in FIG. 6. Or, the invention may also be applied to a container made of material other than resin.

EXAMPLES

Shape comparisons were made due to difference in the curvature radius of the arcuate portion 14 in the container spout portion 10.

Figure 4:
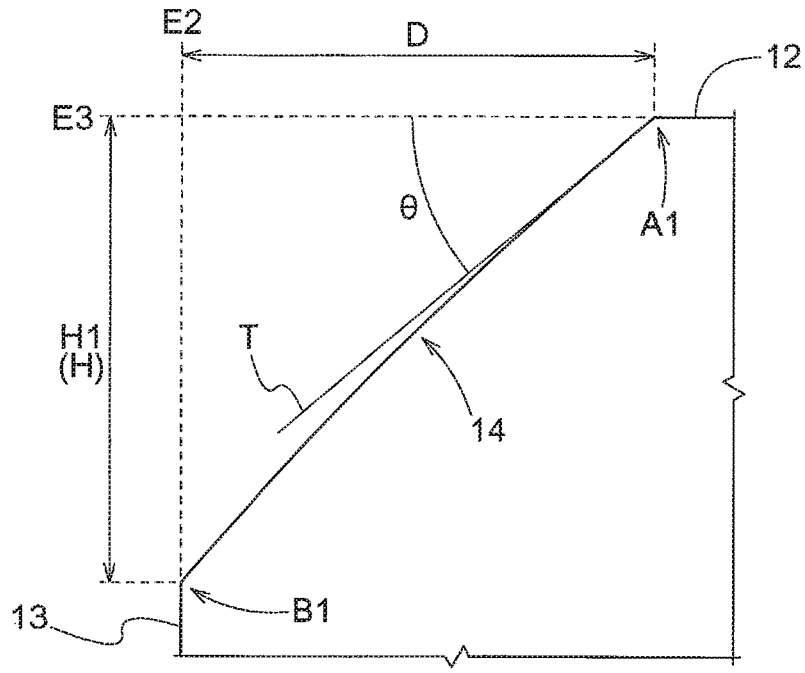
FIG. 4 is an enlarged view of the principal portions of the container spout when an arcuate portion has a curvature radius of 3.0 mm.

In an example shown in FIG. 4, the curvature radius of the arcuate portion 14 was set to 3.0 mm. In an example shown in FIG. 5, the curvature radius of the arcuate portion 14 was set to 6.0 mm.

Figure 5:
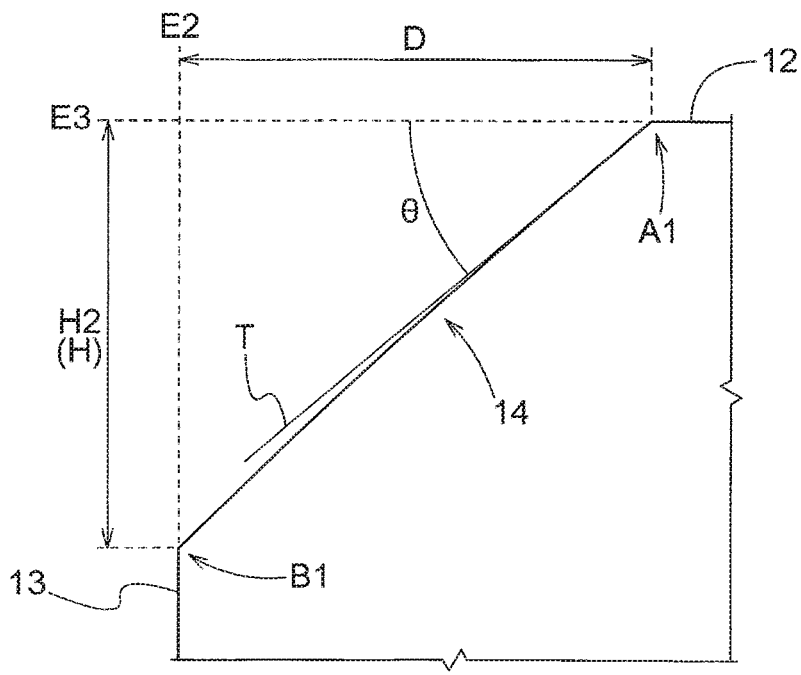
FIG. 5 is an enlarged view of the principal portions of the container spout when an arcuate portion has a curvature radius of 6.0 mm.

In these two examples shown respectively in FIG. 4 and FIG. 5, no further (other) arcuate portions than the arcuate portion 14 were provided. And, the angle between the top face 12 and the tangential line T was 40 degree in both examples. Further, the distance D from the joining point A1 between the arcuate portion 14 and the top face 12 to the virtual extension line E2 of the inner circumferential face 13 was set identical in both the examples.

In the above, a distance H1 from the joining point B1 between the arcuate portion 14 and the inner circumferential face 13 to the virtual extension line E3 of the top face 12 in the example of FIG. 4 was longer than a distance H2 from the joining point B1 between the arcuate portion 14 and the inner circumferential face 13 to the virtual extension line E3 of the top face 12 in the example of FIG. 5 (H1>H2). Namely, it was found that even when the angle of the tangential line T remains same, decrease in the curvature radius of the arcuate portion 14 results in lowering of the position of the joining point B1 between the arcuate portion 14 and the inner circumferential face 13, Next, 10 (ten) units of preforms (forming material: PET, weight: 27.5 g) having the container spout portion relating to the foregoing embodiment were made, with the curvature radius of the arcuate portion 14 being 3.0 mm, the respective curvature radii of the second arcuate portion 15 and the third arcuate portion 16 being both 0.3 mm, the angle between the top face 12 and the tangential line T being 40 degrees. Then, evaluation tests which simulated collision between the preforms at the time of transportation were made.

On these ten units of preforms, collision tests were conducted to check whether any damage was formed in each container spout portion. The result was that eight out of the ten units had no damage. Although dent damages were confirmed in the remaining two units, no dent damages were found therein at the joining point between the arcuate portion and the inner circumferential face. On the other hand, when similar tests were conducted on ten units of preforms having conventional spout portions having no chamfering, the result was that dent damages were confirmed in all the ten units. Therefore, it was confirmed that with the inventive container spout portion, generation/formation of dent damage in the container spout portion, in particular, such dent damage at the joining point between the arcuate portion and the inner circumferential face can be reduced effectively.

INDUSTRIAL APPLICABILITY

The container spout portion according to the present invention can be used suitably in the industrial field relating to containers to be fitted with caps.

DESCRIPTION OF SIGNS

1: bottle container
2: container body
3: shoulder portion
4: body portion
5: bottom portion
10: container spout portion
11: thread
12: top face
13: inner circumferential face
14: arcuate portion
15 second arcuate portion
16: third arcuate portion
17: outer circumferential face
20: cap
21: top plate portion
22: tubular portion
23: outer ring 24: inner ring
25: thread
T: tangential line
E1: virtual extension line of arcuate portion
E2: virtual extension line of inner circumferential face
E3: virtual extension line of top face
A1: joining point between arcuate portion and top face
A2: crossing point between virtual extension line of arcuate portion and top face or virtual extension line of top face
B1: joining point between arcuate portion and inner circumferential face
B2: crossing point between virtual extension line of arcuate portion and inner circumferential face or virtual extension line of inner circumferential face
D: distance
H: distance
P: preform

The invention claimed is:

1. A container spout portion included in a container body and configured to be sealed as a seal portion comes into contact with an inner circumferential face in association of attachment thereto of a cap having the seal portion therein;
wherein the container spout portion includes an outer circumferential face provided with a thread;
an arcuate portion convex inwards is formed between a top face and the inner circumferential face of the container spout portion;
a tangential line to the arcuate portion starts from either a joining point between the arcuate portion and the top face or from a crossing point between a virtual extension line of the arcuate portion and the top face or a virtual extension line of the top face;
an angle formed between the top face and the tangential line ranges from 30 to 50 degrees; and
a distance from a joining portion between the arcuate portion and the inner circumferential face or a crossing point between the virtual extension line of the arcuate portion and either the inner circumferential face or a virtual extension line of the inner circumferential face to the virtual extension line of the top face ranges from 0.3 mm to 1.0 mm, and wherein a distance from the joining point between the arcuate portion and the top face or the crossing point between the virtual extension line of the arcuate portion and either the top face or the virtual extension line of the top face to the virtual extension line of the inner circumferential face is larger than the distance from the joining portion between the arcuate portion and the inner circumferential face or the crossing point between the virtual extension line of the arcuate portion and either the inner circumferential face or the virtual extension line of the inner circumferential face to the virtual extension line of the top face.

2. The container spout portion of claim 1, wherein the arcuate portion has a curvature radius equal to or less than 6 mm.

3. The container spout portion of claim 1, wherein a distance from the joining point between the arcuate portion and the top face or the crossing point between the virtual extension line of the arcuate portion and either the top face or the virtual extension line of the top face to the virtual extension line of the inner circumferential face ranges from 0.3 mm to 3.0 mm.

4. The container spout portion of claim 1, wherein a second arcuate portion is formed between the arcuate portion and the top face and a third arcuate portion is formed between the arcuate portion and the inner circumferential face, and both the second arcuate portion and the third arcuate portion have a smaller curvature radius than the arcuate portion.

5. The container spout portion of claim 1, wherein the container body is made of resin.

6. The container spout portion of claim 1, wherein the container body is a preform.

* * * * *

UNITED STATES PATENT AND TRADEMARK OFFICE
CERTIFICATE OF CORRECTION

| | |
|---|---|
| PATENT NO. | : 11,518,570 B2 |
| APPLICATION NO. | : 16/618418 |
| DATED | : December 6, 2022 |
| INVENTOR(S) | : Takuya Sakurai et al. |

It is certified that error appears in the above-identified patent and that said Letters Patent is hereby corrected as shown below:

On the Title Page

(73) Assignee, Line 1, please change "SUNTORV HOLDINGS LIMITED" to -- SUNTORY HOLDINGS LIMITED --.

Signed and Sealed this
Second Day of May, 2023

Katherine Kelly Vidal
*Director of the United States Patent and Trademark Office*